(12) United States Patent
Getsoian et al.

(10) Patent No.: US 9,914,095 B1
(45) Date of Patent: Mar. 13, 2018

(54) CATALYST FOR AUTOMOTIVE EMISSIONS CONTROL

(71) Applicant: FORD GLOBAL TECHNOLOGIES, LLC, Dearborn, MI (US)

(72) Inventors: Andrew Gregory Getsoian, Canton, MI (US); Joseph Robert Theis, Rockwood, MI (US); Christine Kay Lambert, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/427,618

(22) Filed: Feb. 8, 2017

(51) Int. Cl.
*B01D 53/94* (2006.01)
*B01J 23/44* (2006.01)
*B01J 37/00* (2006.01)
*F01N 3/10* (2006.01)
*B01J 21/06* (2006.01)
*B01J 23/46* (2006.01)
*B01J 37/02* (2006.01)
(Continued)

(52) U.S. Cl.
CPC ....... *B01D 53/945* (2013.01); *B01D 46/0061* (2013.01); *B01J 21/04* (2013.01); *B01J 21/063* (2013.01); *B01J 23/44* (2013.01); *B01J 23/464* (2013.01); *B01J 37/0221* (2013.01); *F01N 3/101* (2013.01); *B01D 2255/1023* (2013.01); *B01D 2255/1025* (2013.01); *B01D 2255/2092* (2013.01); *B01D 2255/20707* (2013.01); *B01D 2255/20715* (2013.01)

(58) Field of Classification Search
CPC ............. B01D 53/9445; B01D 53/945; B01D 2255/1023; B01D 2255/1025; B01D 2258/012; B01D 2258/014; F01N 3/101; B01J 23/44; B01J 23/464; B01J 37/00; B01J 37/0215
See application file for complete search history.

(56) References Cited

U.S. PATENT DOCUMENTS 4,992,405 A 2/1991 Chattha et al.
5,196,175 A * 3/1993 Subramanian ....... B01D 53/945
423/213.5
(Continued)

FOREIGN PATENT DOCUMENTS

EP 2589427 A2 * 5/2013 ............ B01J 23/464
GB 0922612 * 2/2010 ............ B01J 23/464
KR 101230272 B1 * 2/2013 ............ B01D 53/945

OTHER PUBLICATIONS

Federal Register, Environmental Protection Agency, vol. 69, No. 64, Apr. 2, 2004, Emission Durability Procedures for New Light-Duty Vehicles, Light-Duty Trucks and Heavy-Duty Vehicles; Proposed Rule, Part III, pp. 17532-17568.

*Primary Examiner* — Timothy C Vanoy
(74) *Attorney, Agent, or Firm* — Damian Porcari; Brooks Kushman P.C.

(57) ABSTRACT

A method utilizes a three-way catalytic converter, having a catalyst formed from a plurality of particles each including a first metal oxide center, a second metal oxide monolayer, and a catalytically active metal to decrease concentration of hydrocarbons, carbon monoxide, and nitrogen oxides in exhaust gas during stoichiometric, rich, and lean conditions, wherein a molar ratio of metal in the monolayers to metal in the centers is between about 0.01 and 0.2.

20 Claims, 8 Drawing Sheets

(51) Int. Cl.
*B01J 21/04* (2006.01)
*B01D 46/00* (2006.01)

(56) References Cited

U.S. PATENT DOCUMENTS

| | | | |
|---|---|---|---|
| 5,459,119 A * | 10/1995 | Abe | B01D 53/945 |
| | | | 423/213.5 |
| 6,569,392 B1 * | 5/2003 | Li | B01D 53/945 |
| | | | 423/213.5 |
| 8,034,311 B2 | 10/2011 | Ikeda et al. | |
| 8,459,010 B2 | 6/2013 | Hancu et al. | |
| 8,986,637 B2 | 3/2015 | Fisher et al. | |
| 2004/0166036 A1 | 8/2004 | Chen et al. | |
| 2007/0197373 A1 * | 8/2007 | Miura | B01D 53/945 |
| | | | 502/100 |
| 2011/0111952 A1 * | 5/2011 | Shiratori | B01D 53/945 |
| | | | 502/242 |
| 2016/0074855 A1 * | 3/2016 | Qi | B01J 37/0228 |
| | | | 502/304 |

* cited by examiner

CATALYST FOR AUTOMOTIVE EMISSIONS CONTROL

TECHNICAL FIELD

The disclosure relates to an automotive catalyst, a method of operating the catalyst, and a method of producing the same.

BACKGROUND

Reduction of tailpipe emissions is a challenging goal in the automotive industry. As the acceptable values for tailpipe emissions continue to decrease, technologies must continually improve to meet the standards. Many efforts have been focused on reduction of various hydrocarbons (HCs), carbon monoxide (CO), and mono-nitrogen oxides NO and $NO_2$ (NOx) emissions. Various catalysts capable of converting HC species, CO, and NOx have been developed. Yet, providing a catalyst capable of conversion at relatively low temperatures as well as during various operating conditions of the engine has remained a challenge.

SUMMARY

In at least one embodiment, a method is disclosed. The method utilizes a three-way catalytic converter, having a catalyst formed from a plurality of particles each including a first metal oxide center, a second metal oxide monolayer, and a catalytically active metal to decrease concentration of hydrocarbons, carbon monoxide, and nitrogen oxides in exhaust gas during stoichiometric, rich, and lean conditions, wherein a molar ratio of metal in the monolayers to metal in the centers is between about 0.01 and 0.2. The interfaces between the centers and monolayers, the monolayers, or both include catalytically active metal. Some of the monolayers may be continuous. The centers may include transitional alumina, baria, lanthana, silica, titania, zirconia, or a combination thereof. The monolayers may include ceria, cobalt oxide, iron oxide, hafnia, manganese oxide, niobia, tantala, titania, zirconia, or a combination thereof. The centers may be stabilized with about 1 to 15 wt. % of barium, lanthanum, silicon, or a combination thereof, based on a total weight of the catalyst. The loading of the catalytically active metal may be about 2.0 wt. % for palladium and about 0.5 wt. for rhodium, based on a total weight of the catalyst. The catalyst may be coated onto a ceramic or metallic monolith substrate that defines flow through channels or a wall flow configuration. The method may further include trapping and oxidizing soot during cold start. The method may further include converting at least 90% of CO at a temperature between about 150° C. and 250° C., NO at a temperature between about 200° C. and 270° C., $C_2H_4$ at a temperature between about 200° C. and 270° C., $C_3H_6$ at a temperature between about 200° C. and 270° C., $C_3H_8$ at a temperature between about 230° C. and 350° C., or a combination thereof.

In another embodiment, a method of forming a catalytic converter catalyst is disclosed. The method may include arranging first and second metal oxides to form particles each with a center of the first metal oxide and a monolayer of the second metal oxide on the center by contacting the centers with a soluble complex of one or more elements of the second metal oxide at a molar ratio of metal in the second metal oxide to metal in the first metal oxide of about 0.01 to 0.2. The method may further include depositing catalytically active metal onto each of the monolayers at interfaces between the first and second metal oxides, or both. The soluble complex may include one or more alkoxide groups. The soluble complex may include a metal alkoxide having a formula $M_x(OR)_v$ (I), wherein M is Ti, Zr, Hf, Ni, or Ta, R is a linear or branched alkyl group having a formula $C_nH_{2n+1}$, wherein n is 1 to 6, x is 1 or 2, and v is 4, 5, 8, or 10. The method may further include applying the formed catalyst onto a ceramic or metal monolithic substrate.

In a yet another embodiment, an automotive catalytic converter catalyst is disclosed. The catalyst includes a first metal oxide forming each of a plurality of automotive catalytic converter catalyst particle centers. The catalyst also includes a second metal oxide applied as a monolayer to each of the centers. The catalyst further includes a catalytically active metal deposited onto each of the centers, the monolayers, or both, wherein a molar ratio of metal in the second metal oxide to metal in the first metal oxide is between about 0.01 and 0.2. Some of the monolayers may be discontinuous. The first metal oxide may include transitional alumina, baria, lanthana, silica, titania, zirconia, or a combination thereof. The second metal oxide may include ceria, cobalt oxide, iron oxide, hafnia, manganese oxide, niobia, tantala, titania, zirconia, or a combination thereof. The first metal oxide may be stabilized with about 1 to 15 wt. % of barium, lanthanum, silicon, or a combination thereof, based on the total weight of the catalyst. The first metal oxide may be transitional alumina, the second metal oxide may be about 10-14 wt. % $TiO_2$, and the catalytically active metal may be rhodium at about 0.3-0.7 wt. % loading, based on a total weight of the catalyst.

DETAILED DESCRIPTION

Figure 1A:
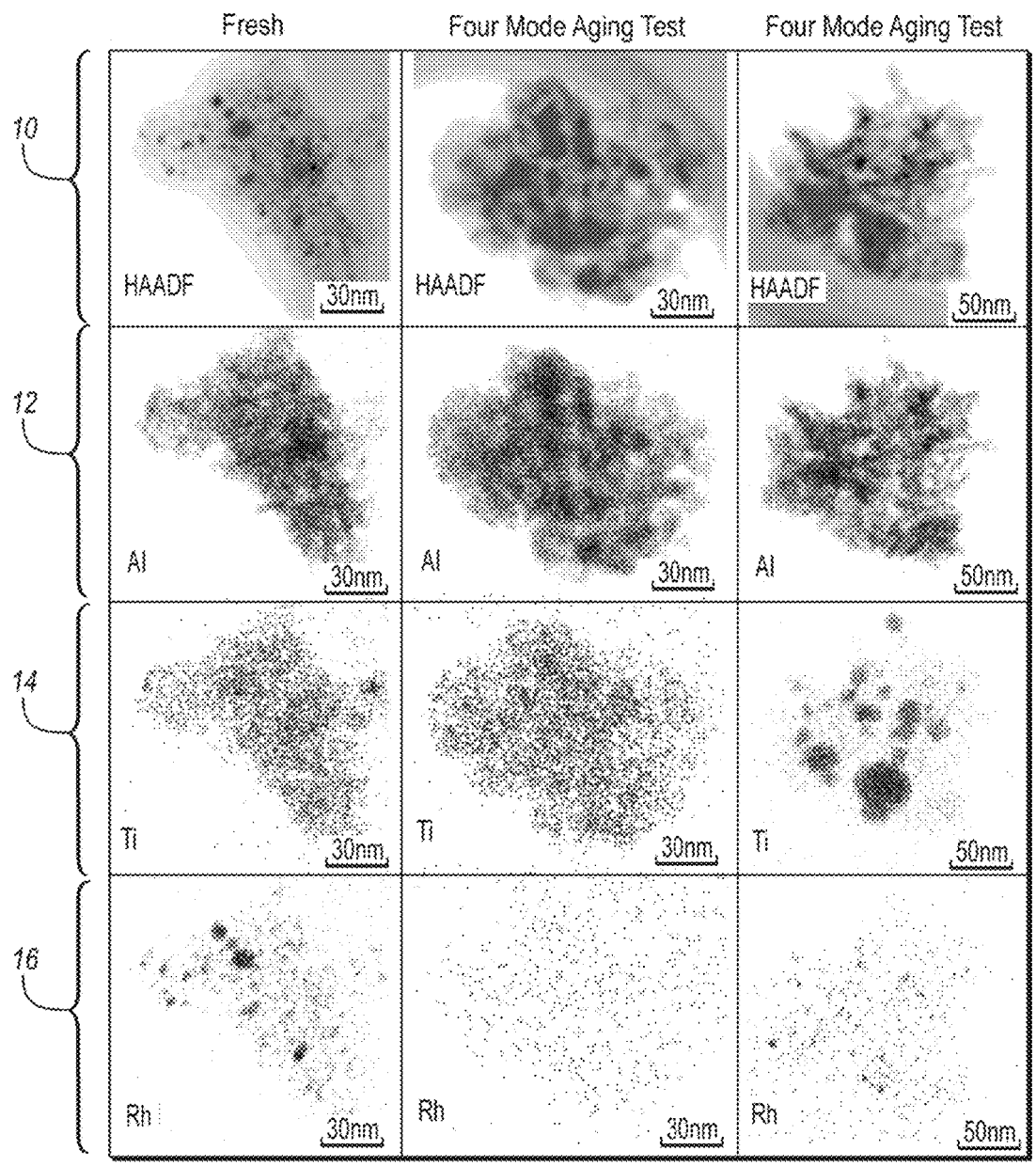
FIG. 1A depicts a series of transmission electron microscopy (TEM) photographs capturing a catalyst particle and its respective layers before aging (Fresh) and after the Four Mode Aging test according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The exhaust gas from internal combustion engines, including those used in automotive applications, contains HCs, CO, and NOx in concentrations greater than can be permissibly emitted into the environment. As the demand for environmentally-conscious technologies grows, regulations regarding the automotive emissions are becoming increasingly more stringent. An example classification for passenger vehicle emissions is Super Ultra-Low Emission Vehicle SULEV20 and SULEV30. The SULEV classification is based on producing 90% less emissions than an equivalent gasoline-powered vehicle. The SULEV vehicles are thus 90% cleaner than the average new vehicle for the model year. To comply with the SULEV and similar classifications, various strategies have been implemented, for example, improving catalysts incorporated into catalytic converters.

The concentrations of the undesirable exhaust components named above are typically reduced by their interaction with a suitable catalytic converter. A typical catalytic converter may include precious metal dispersed on oxides of aluminum, cerium, zirconium, or the like. The ability of a catalytic converter to effectively decrease concentrations of HCs, CO, and NOx depends upon the temperature of the catalytic converter. The temperature above which the catalytic converter becomes active in the conversion of a particular exhaust component is called the light off temperature of that component.

Under some vehicle operating conditions, especially under cold start conditions, engine exhaust may pass through a catalytic converter while the temperature of the converter is below the light off temperature of one or more exhaust components. Cold start emissions relate to the emissions of gasoline and diesel passenger vehicles which are not reduced by catalysts during a warm-up phase of the vehicle. Before the engine reaches the temperature sufficient to warm the catalyst after a vehicle is started, emissions are not being reduced and thus represent a significant portion of overall tailpipe emissions. The duration of the cold start period and the overall emissions produced during this phase depend on the ambient temperature, the type of fuel used, the initial temperature of the vehicle's propulsion system, and other factors. Under such operating conditions, the catalytic converter is unable to effectively reduce the concentration of one or more undesirable exhaust gas components. Thus, it would be desirable to develop a catalyst capable of warming up quickly and lighting off at relatively low temperatures such as about 150° C.

In addition, future, more fuel-efficient powertrains that utilize internal combustion engines may have lower operating temperatures than today's powertrains. These lower operating temperatures may create exhaust gas with temperatures below the current activity window of today's three-way catalysts. It is therefore desirable to decrease the light off temperature of a catalytic converter to widen the range of vehicle operating conditions under which the catalytic converter is effective.

Furthermore, as was stated above, a typical catalytic converter implements one or more precious metals which have the catalytic activity to promote the reduction of NOx and the oxidation of HCs and CO at moderate temperatures (e.g., about 300 to 500° C.) when the engine runs at stoichiometry, that is when the air-fuel ratio (AFR) is the ideal ratio of air to fuel that burns all fuel with no excess air. For gasoline engines, the stoichiometric AFR is 14.7:1, which means 14.7 parts of air to one part of fuel. The stoichiometric AFR depends on the type of fuel. For example, for alcohol, the stoichiometric AFR is 6.4:1 and for diesel, the stoichiometric AFR is 14.5:1. Generally, an engine operating at the stoichiometric AFR oscillates between a slightly rich condition and a slightly lean condition at frequencies on the order of about 0.5 to 3.0 Hz and with magnitudes on the order of +/−0.07 lambda, +/−0.05 lambda, +/−0.03 lambda, or +/−0.01 lambda, depending on the engine and control system. Yet, the time-averaged AFR considering the oscillations is very close to the stoichiometric AFR. Thus, the term "stoichiometric AFR," as used herein, refers to the time-averaged AFR being near stoichiometry. Likewise, the term "stoichiometry," as used herein, refers to the true stoichiometric conditions when the AFR is ideal as well as to slightly lean and slightly rich conditions which are reached during the oscillations. All the measurements referenced herein described as performed at oxygen level of 0.69% relate to Lambda=0.998 and at oxygen level of 0.74% relate to Lambda=1.000. Lambda=1.00 relates to stoichiometric condition. Lambda=0.998 relates to slightly lean condition.

The catalyst may be exposed to lean, stoichiometric, and rich conditions at temperatures as high as 1000° C. during high load engine operations. Under such conditions, the precious metals and/or the washcoat components can sinter such that in time, the catalyst becomes less active. As a result, the catalytic conversion becomes less and less effective in time. Thus, there is a need for a catalyst which would be robust enough to survive a variety of conditions including rich, lean, and stoichiometry at high temperatures of up to 1000° C., and which would still be capable of converting high percentages (about 90% or more) of HCs, CO, NOx during vehicle operation including during cold start, rich, lean, and stoichiometric conditions at moderate (about 300-500° C.) and low (below about 300° C.) temperatures. The catalyst is thus capable of HCs, CO, and NOx conversion at stoichiometry and near-stoichiometry conditions after surviving lean and rich operation at high temperatures (above about 500° C.).

In one or more embodiments, a catalyst 10 overcoming one or more disadvantages named above is disclosed. The catalyst material is an automotive catalytic converter catalyst. The catalyst material may include one or more particles. The TEM images of the catalyst 10 are shown in FIG. 1A which captures a view of the overall catalyst particle 10 as well as individual material layers of the particle 10 as discussed below before aging and after aging of the catalyst 10. As can be seen in the FIGS. 1A-1D, the catalyst 10 particle includes a first metal oxide 12. The first metal oxide 12 may form a center of a catalyst particle 10. The word "center" as used herein relates to a support material, particulate material, internal layer or material of any shape, form, or configuration. The first metal oxide 12 may function as a support oxide. The first metal oxide 12 may include transitional alumina, silica, titania, zirconia, lanthana, baria, or a combination thereof. The first metal oxide 12 may be further modified with about 1 to 15 wt. %, 2 to 13 wt. %, or 5 to 10 wt. % of silicon, lanthanum, barium, or a combination thereof. Unless specified otherwise, a weight percentage expressed in this disclosure is a weight percentage based on the total weight of the catalyst. The first metal oxide 12 may be transitional alumina with an initial surface area in excess of about 200 m$^2$/g capable of retaining high surface area of at least about 100 to 150 m$^2$/g in the presence of automotive exhaust at temperatures up to about 1000° C.

Figure 1B:
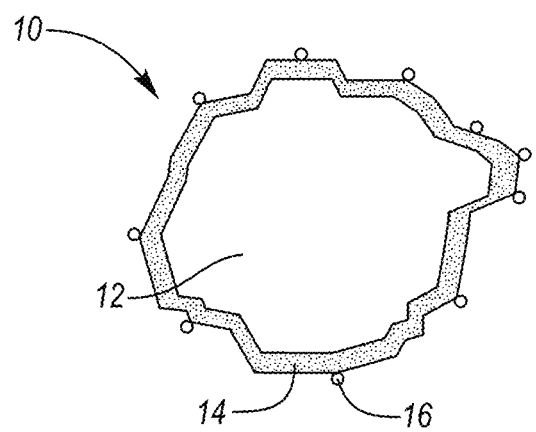
FIGS. 1B and 1D show a schematic cross-section of the catalyst particle depicted in FIG. 1A.
Figure 1C:
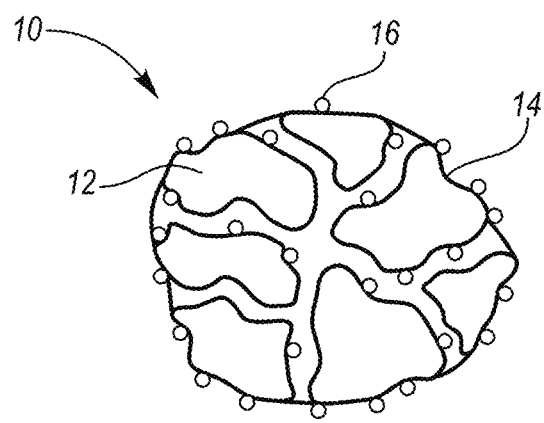
FIG. 1C depicts a schematic top view of the catalyst particle depicted in FIG. 1A.

The first metal oxide 12 is overlayed with a second metal oxide 14. The second metal oxide 14 may form a monolayer. The monolayer may be continuous such that the second metal oxide 14 covers the entire surface area of the first metal oxide 12 and forms a uniform coating around the entire surface area of the first metal oxide 12, as is shown in FIG. 1B. Alternatively, as is shown in FIG. 1C, the monolayer may be discontinuous such that the second metal oxide 14 forms one or more islands on portions of the surface of the first metal oxide 12. In such embodiment, the surface area of the first metal oxide 12 is incompletely covered by the monolayer 14 and at least one portion of the first metal oxide 12 remains exposed. In one or more embodiments, more than one monolayer 14 of the second metal oxide 14 may be present. Thus, the first metal oxide 12 may have one or more portions with one monolayer in addition to at least one other portion having an additional layer(s) of the second metal oxide 14. The second metal oxide 14 overlayer thus may have varying dimensions such as thickness. The second metal oxide 14 may be a promotor oxide such that the support metal oxide 12 is coated with a monolayer of the promoter oxide 14. The varying dimensions may be present initially or as a result of catalyst aging. The second metal oxide 14 may include titania, zirconia, hafnia, niobia, tantala, ceria, manganese oxide, cobalt oxide, iron oxide, or a combination thereof.

The placement of the second metal oxide 14 as well as the molar ratio of the metal in the second oxide to the metal in the first oxide contribute to the desired properties of the catalyst 10. The molar ratio is selected to produce a desired monolayer coverage of the second metal oxide 14, as was discussed above. The molar ratio of metal of the second oxide 14 to metal in the first oxide 12 may be between about 0.01 and 0.2, 0.05 to 0.15, 0.08 to 0.12, or 0.1 to 0.3. A molar ratio lower than 0.01 is unlikely to provide any benefit to the light off temperature. Ratios greater than 0.2 are unlikely to provide effective interface 18 between the first metal oxide 12 and the monolayer 14 and may promote undesirable sintering of the second metal oxide 14. The extent to which the second metal oxide 14 continuously covers the first metal oxide support 12 depends in part upon the molar ratio of a metal complex used to form the second metal oxide 14 to the first metal oxide support 12.

Figure 1D:
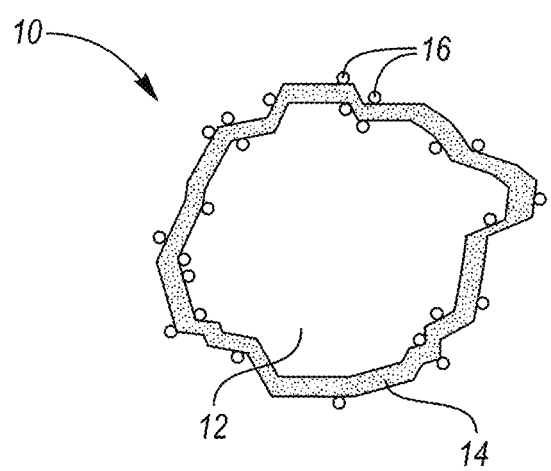

The catalyst 10 further includes a catalytically active metal 16. The active metal 16 may be deposited on the monolayer of the second metal oxide 14, as is shown in FIG. 1B. Alternatively, or in addition, the active metal 16 may be deposited on the interface 18 between the first metal oxide 12 and the second metal oxide 14, as is shown in FIG. 1D. In one or more embodiments, the catalyst 10 may contain one or more particles including only the first metal oxide 12 lacking an overlayer 14, the active metal 16, or both.

The catalytically active metal 16 may be rhodium, palladium, platinum, iridium, ruthenium, nickel, copper, silver, gold, or a combination thereof. One or more types of catalytically active metal 16 may be used on the interface 18 and on the second metal oxide 14. The same or different active metal 16 may be used on the interface 18 and the second metal oxide 14.

Figure 2:
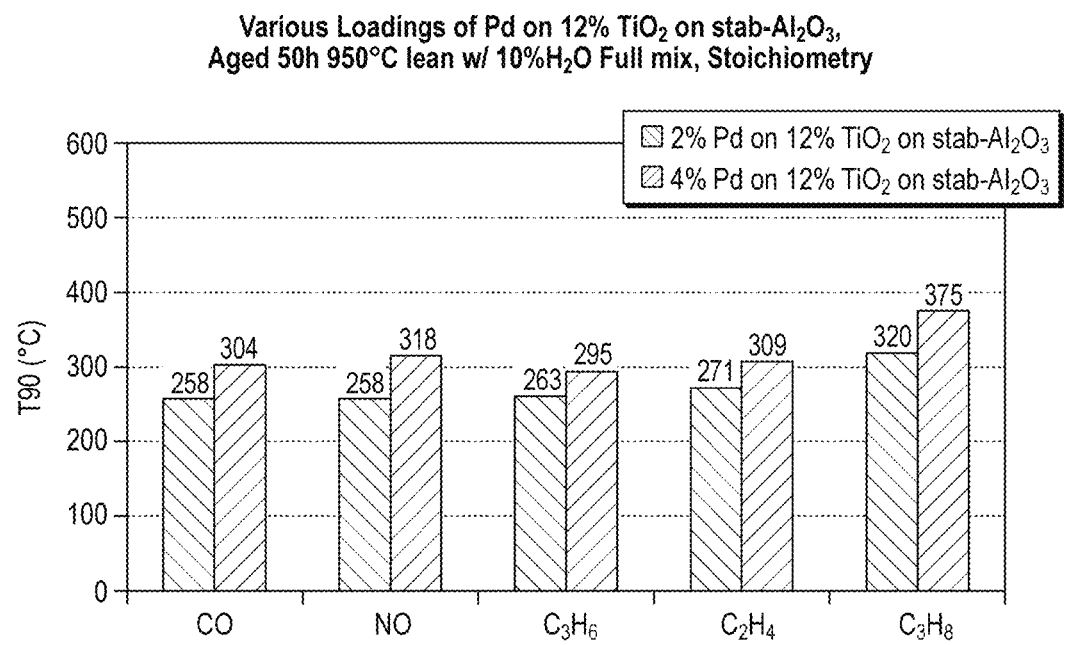
FIG. 2 depicts a plot of conversion temperature versus HCs, CO, and NO 90% conversion by a catalyst having various loadings of palladium on 8 wt. % titanium (12 wt. % $TiO_2$) overlaying stabilized $Al_2O_3$ support oxide after Lean Aging test, measured at stoichiometry.

The loading of the catalytically active metal 16 may be about 0.1 to 5 wt. %, 0.5 to 2 wt. %, or 1 to 1.5 wt. %. Each active metal may have a different optimal loading. For example, the optimal loading of rhodium may be from about 0.2 to 0.8 wt. %, 0.3 to 0.7 wt. %, or 0.5 to 0.6 wt. %. The optimal loading of palladium may be about 1.5 to 2.5 wt. %, 1.8 to 2.3 wt. %, or 2 to 2.1 wt. %. FIG. 2 illustrates performance of the catalyst having either 2 wt. % or 4 wt. % loading of palladium on 8 wt. % titanium (12 wt. % TiO$_2$) overlaying Al$_2$O$_3$ first support oxide after the catalyst was aged in the Lean Aging Test referenced below and measured at stoichiometry (Lambda=1.00, O2 at 0.74% for the conditions of the test). "T90 (° C.)" relates to a temperature at which 90% conversion of a species was achieved in the Figures throughout the disclosure. The data in FIG. 2 are captured in Table 9, Examples 9 and 15.

Figure 3:
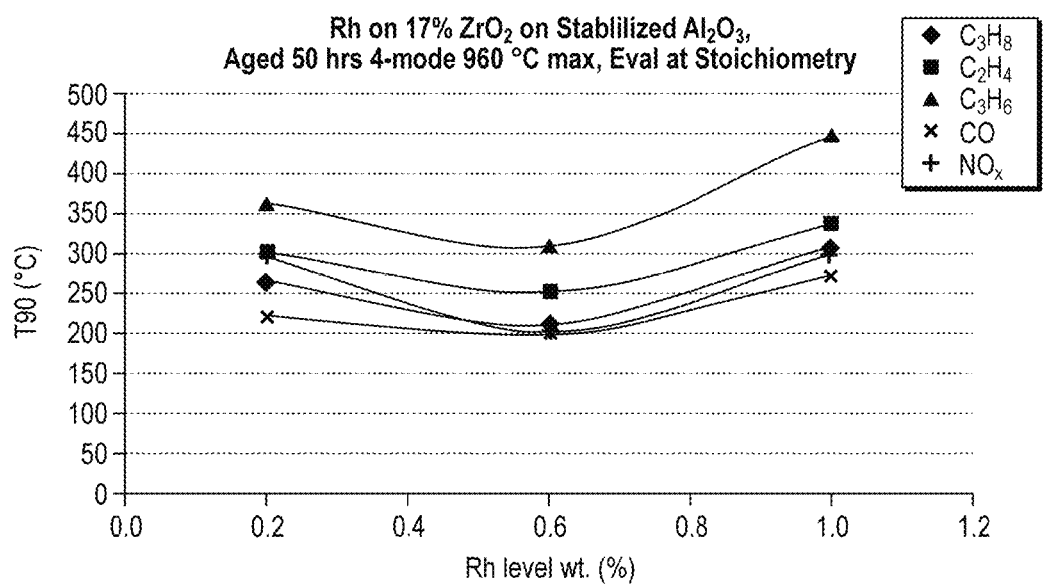
FIGS. 3 and 4 depict plots of rhodium loading versus HCs, CO, and NOx conversion by catalysts having various loadings of rhodium on 15 wt. % zirconium (17 wt. % $ZrO_2$) overlaying stabilized $Al_2O_3$ support after Four Mode Aging test, measured at stoichiometry.
Figure 4:
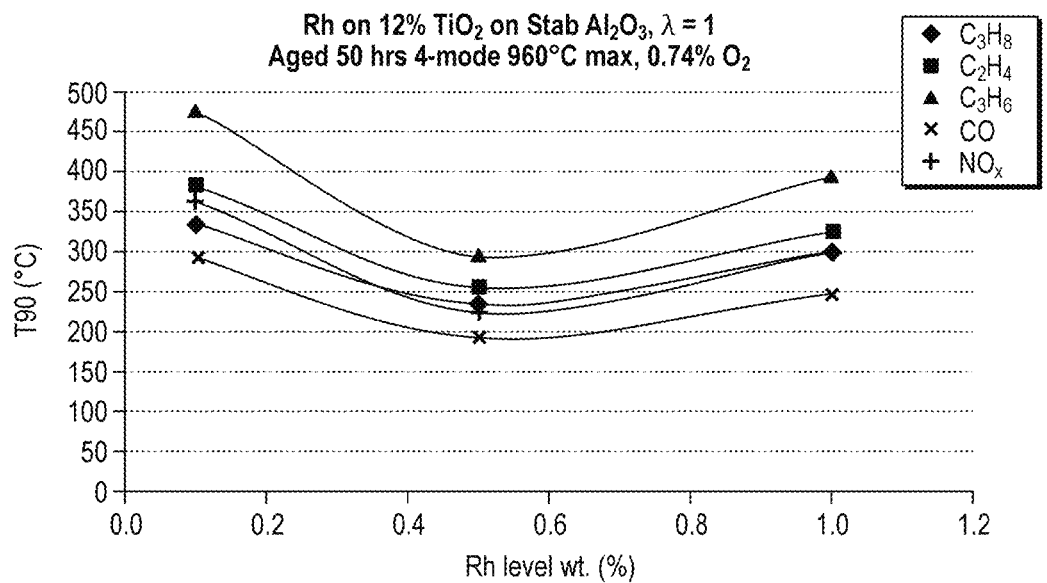

FIGS. 3 and 4 illustrate performance of the catalysts having various loadings of rhodium on 17 wt. % ZrO$_2$ and 12 wt. % TiO$_2$ second oxide, respectively, overlaying Al$_2$O$_3$ first support oxide, after the catalyst was aged in the Four Mode Aging test referenced below and measured at stoichiometry (Lambda=1.00, 02 at 0.74% for the conditions of the test). The data in FIGS. 3 and 4 are captured in Table 14, Examples 20-25.

As was stated above, transitional alumina retains relatively high surface area even in the presence of automotive exhaust at temperatures up to about 1000° C. The retained high surface area enables high dispersion of catalytically active metal 16, which reduces the loading of the catalytically active metal 16 required to achieve the required degree of catalytic activity. But alumina, or another first metal oxide 12, does not promote the activity of precious metal beyond supplying a large surface area onto which the catalytically active metal can disperse. Thus, using a first metal oxide 12 by itself does not provide an optimal solution.

A number of transition metal oxides, including but not limited to oxides of titania, zirconia, iron, cobalt, manganese, or any other second metal oxide 14 named above, promotes activity of the catalytically active metal 16, thereby improving the activity of the catalytically active metal 16 at low temperatures, reducing the loading of the metal 16 required to achieve the required degree of catalytic activity, or both. But the second metal oxides 14 are not robust in the presence of automotive exhaust at temperatures up to about 1000° C., undergoing dramatic losses in surface area that limit their ability to disperse catalytically active metal 16. Lack of robustness has limited the application of transition metal oxides capable of promoting the activity of catalytically active metals in automotive emissions catalysis in the past.

In contrast, the present disclosure combines the stability/robustness and high surface area of a first metal oxide support 12 with the capability of the second metal oxide 14 to promote the catalytic activity of the catalytically active metal 16 to produce a catalyst 10 that is robust under automotive exhaust conditions at temperatures up to about 1000° C. while also promoting the activity of the catalytically active metal 16. The catalyst 10 thus enables automotive emissions to be controlled in a wider temperature range and at lower temperatures than catalysts prepared according to conventional procedures or catalysts including only one of alumina or a transitional metal oxide, but not both. Alternatively, the catalyst achieves equivalent activity at a given temperature using a lower overall loading of the catalytically active metal 16, reducing the cost of a catalytic converter the catalyst is used in.

Figure 5:
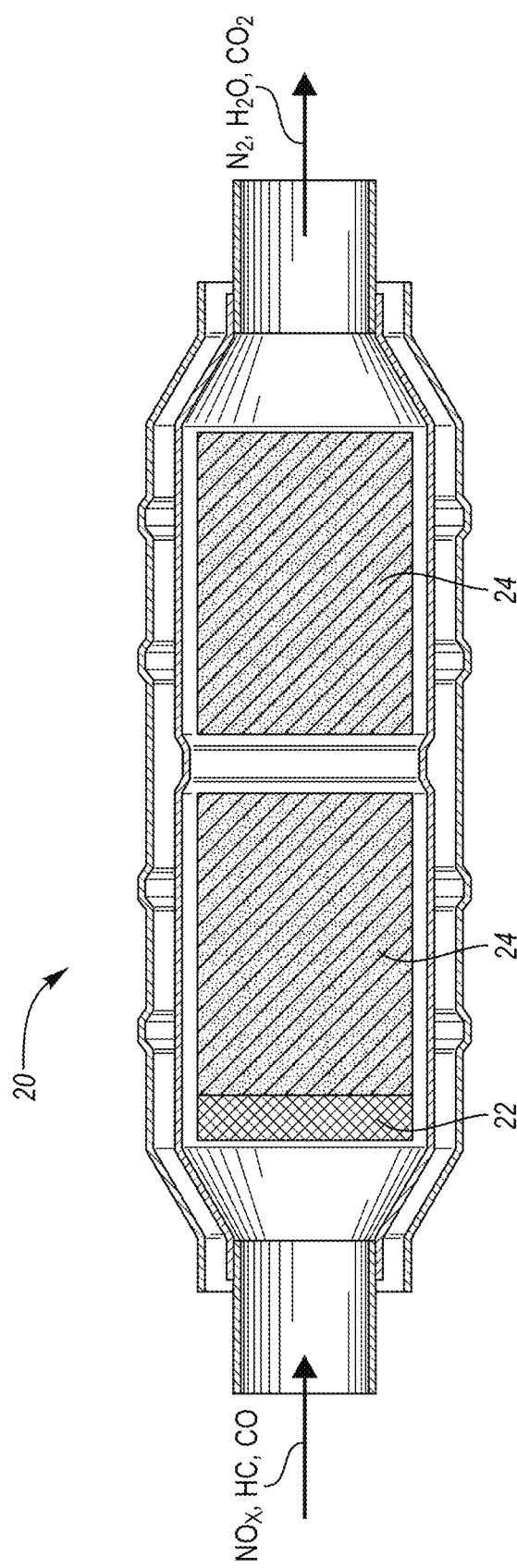
FIG. 5 shows a schematic catalytic converter incorporating a catalyst of one or more embodiments.

The catalyst may be incorporated as a catalyst in any automotive catalytic converter such as a three-way catalytic converter capable of reducing HCs, CO, and NOx emissions. A non-limiting example catalytic converter 20 is schematically depicted in FIG. 5. As FIG. 5 shows, a catalytic converter 20 is disclosed which is capable of converting HCs, CO, and NOx. The catalytic converter 20 may include an optional trap 22 located upstream, and/or downstream from the three-way catalyst (TWC) 24 containing the catalyst 10. Alternatively, the catalyst 10 may be applied onto the trap 22 in addition to the TWC or only onto the trap 22. The catalytic converter 20 and the dimensions and orientation of the depicted layers 22, 24 is just schematic to illustrate the main direction of the exhaust gas flow. The catalytic converter 20 may be configured as flow through channels or having a wall flow configuration. If the catalyst 10 is washcoated onto the trap 22, the wall flow configuration may be used to trap soot also created by the engine, and the catalyst 10 may assist with soot oxidation at cold start and during other engine operating conditions in addition to controlling HCs, CO, and NOx.

The TWC may include a monolith support made of ceramic or metal. The catalyst 10 may be applied onto the TWC by a variety of methods. For example, the catalyst 10 may be coated onto the monolith support.

The catalyst 10 may be produced by a variety of method. The methods named herein are only example production methods. Other methods are contemplated. An example method of forming a catalytic converter catalyst 10 is disclosed. The method includes arranging a first metal oxide 12 and a second metal oxide 14 to form particles covered with a monolayer of the second metal oxide 14 by contacting the first metal oxide particles 12 with a soluble complex of one or more chemical elements such as metals of the second metal oxide 14 in a molar ratio of metal in the second metal oxide to metal in the first oxide of about 0.01 to 0.2, 0.05 to 0.15, 0.08 to 0.12, or 0.1 to 0.3. The method further includes depositing a catalytically active metal 16 onto the monolayer 14 or on the interface 18 at a loading disclosed above.

The soluble complex may include one or more alkoxide groups. The presence of at least one, and more preferably at least two, alkoxide groups is desirable to provide the desired controlled grafting reaction between the metal complex and the first metal oxide support. The metal alkoxide may have a formula of $$M_x(OR)_v \quad (I),$$

wherein M is Ti, Zr, Hf, Ni, or Ta,

R is a linear or branched alkyl group having a formula $C_nH_{2n+1}$, wherein n is 1 to 6, x is 1 or 2, and v is 4, 5, 8, or 10;

or a formula of $$MO(OR)_3 \quad (II),$$

wherein M is Ni or Ta, and

R is a linear or branched alkyl group having a formula $C_nH_{2n+1}$, wherein n is 1 to 6.

Alternatively, the metal complex may contain one or more additional ligands aside from alkoxides, for example titanium diisopropoxide bis(acetylacetonate). Alternatively still, a complexing agent may be added to the metal alkoxide precursor to control its reaction with the first metal oxide. Such complexing agents include, but are not limited to, acetylacetone, methyl acetoacetate, 4-methyl-4-hydroxy-2-pentanone, ethylene glycol, propylene glycol, 1,4-butanediol, ethanolamine, acetic acid, succinic acid, the like, or a combination thereof.

The metal complex may be dissolved in an organic solvent and stirred together with the first metal oxide. The solution may additionally be heated to aid dissolution of the metal complex, to aid reaction between the metal complex and the first metal oxide, or both. The organic solvent may then be removed by filtration or evaporation. Alternately, if the metal complex is a liquid of suitably low viscosity and surface tension, the metal complex may be contacted directly with the first metal oxide without addition of a solvent. The contacting reaction releases alcohol, which may be removed by filtration or evaporation. After removal of the solvent, the coated first metal oxide may be calcined at a temperature between about 200 and 800° C., 300 and 700° C., or 400 and 600° C.

Alternatively, the metal complex may be deposited by chemical vapor deposition or physical vapor deposition. The catalytically active metal may be deposited onto the resulting first metal oxide having the second metal oxide overlayer by a variety of methods. For example, the catalytically active metal may be deposited by chemical vapor deposition, physical vapor deposition, wet impregnation, dry impregnation, post-impregnation, as a catalyzed slurry, by strong electrostatic adsorption, or by another suitable method.

The resulting catalyst may be in the form of a dry powder, a slurry, or a coating. For example, the dry powder may be slurried and washcoated onto a monolithic support of the TWC, as was discussed above.

Figure 6:
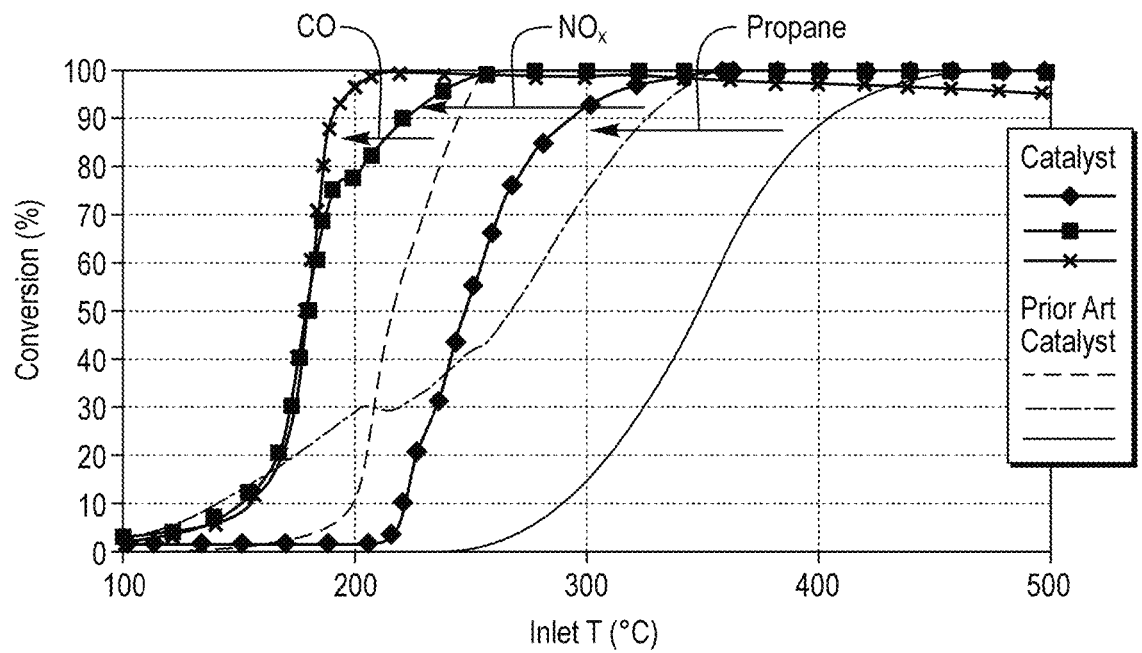
FIG. 6 shows a plot of conversion temperature versus percentage of conversion for CO, NOx, and propane of a prior art catalyst and a disclosed catalyst according to one or more embodiments.

Once incorporated into a TWC, the catalyst is capable of converting various HC species, CO, and NOx contained in an exhaust gas of an internal combustion engine during cold start, at stoichiometric, lean, as well as rich conditions. For example, the catalyst may be able to decrease concentrations of HCs, CO, and NOx of an exhaust gas during cold start, lean, rich, and stoichiometric conditions while retaining its structure, robustness, and activity. Importantly, the catalyst is capable of decreasing concentrations of HCs, CO, and NOx after surviving various operating conditions (stoichiometry, lean, rich) including temperatures of up to 1000° C. The catalyst is also capable of decreasing concentrations of HCs, CO, and NOx at a light off temperature which is about 55 to 180° C. lower than the light off temperatures of typical TWCs, as is illustrated in FIG. 6. FIG. 6 shows comparison of performance of the presently disclosed catalyst 10 and a typical prior art catalyst referenced below. The prior art catalyst contains palladium on particles of ceria-zirconia and alumina, but not the first metal oxide 12 overlayed with second metal oxide 14 and having the catalytically active metal 16 on the overlayer 14, on the interface 18, or both. Catalyst 10 included 70% less precious metal than the prior art catalyst. The catalyst was aged in the Four Mode Aging test referenced below.

The catalyst is capable of converting emissions from automotive exhaust including, but not limited to, ethylene ($C_2H_4$), propylene ($C_3H_6$), ethane ($C_2H_6$), butylene ($C_4H_8$), mesitylene ($C_9H_{12}$), toluene ($C_6H_5$—$CH_3$), iso-octane ($C_8H_{18}$), cyclopentane ($C_5H_{10}$), iso-hexane ($C_6H_{14}$), pentylene ($C_5H_{10}$), dimethylbutane ($(CH_3)_3CCH_2CH_3$), benzene ($C_6H_6$), durene ($C_{10}H_{14}$), propane ($C_3H_8$), methane ($CH4$), nitrogen oxide (NO), nitrogen dioxide ($NO_2$), the like, or a combination thereof.

For example, the catalyst is capable of converting at least 90% of CO at a temperature between about 150° C. and 250° C., NO at a temperature between about 200° C. and 270° C., $C_2H_4$ at a temperature between about 200° C. and 270° C., $C_3H_6$ at a temperature between about 200° C. and 270° C., $C_3H_8$ at a temperature between about 230° C. and 350° C., measured at stoichiometry.

EXAMPLES

Example 1

Example catalyst (1) was prepared in the following manner: a commercial alumina was reacted with an ethanol solution of titanium tetrakis(n-butoxide) (Ti:Al molar ratio 1:12), followed by evaporation of ethanol under heating and subsequent thermal decomposition of the titanium precursor in an oven at 550° C. The resulting material was impregnated with an aqueous solution of tetraamminepalladium(II) nitrate sufficient to yield a final palladium loading of 2 wt. %, and again fired at 550° C.

Comparative example catalyst (A1) was prepared by impregnation of a commercial alumina with an aqueous solution of tetraamminepalladium(II) nitrate sufficient to yield a final palladium loading of 2 wt. %, and fired at 550° C.

Comparative example catalyst (A2) was prepared by combining titanium tetrakis(n-butoxide) and water to precipitate a titanium oxide support according to sol gel synthesis procedures. The resulting precipitate was fired in an oven at 550° C. The fired oxide was then impregnated with an aqueous solution of tetraamminepalladium(II) nitrate sufficient to yield a final palladium loading of 2 wt. %, and fired at 550° C.

Comparative example catalyst (A3) was prepared by combining titanium tetrakis(n-butoxide), tetraamminepalladium(II) nitrate, and water to co-precipitate a palladium-containing titanium oxide support according to sol gel synthesis procedures known to those skilled in the art. The resulting precipitate was fired in an oven at 550° C. The loading of palladium was 2 wt. %.

Example catalyst 1 and Comparative example catalysts A1-A3 were placed in an oven and heated to 950° C. in the presence of 10% water vapor for 50 hours (lean aging). This test is referenced herein as the Lean Aging test.

After aging, the catalytic performance of Example catalyst 1 and each Comparative example catalyst A1-A3 was evaluated using a flow-through micro reactor. In separate and reproducible tests, 1.0 g of each catalyst (powder) and comparative example catalyst (powder) was loaded into a quartz tube micro reactor and exposed to a gas mixture. The gas mixture included 10% $CO_2$, 10% $H_2O$, 6900 ppm $O_2$, 5000 ppm CO, 1700 ppm $H_2$, 1000 ppm NO, 525 ppm $C_2H_4$, 500 ppm $C_3H_6$, 150 ppm $C_3H_8$, remainder $N_2$, at a total flow rate of 3.6 L/min. The mixture provided a suitable model of the exhaust from a gasoline engine operating under a slight rich bias, with a space velocity equivalent to that experienced by a monolith catalyst operating at 30,000 inverse hours. The temperature of the reactor was then increased at 5° C./min from 100° C. to 600° C., and the temperature at which the conversion of each reactant gas (CO, NO, $C_2H_4$, $C_3H_6$, $C_3H_8$) reached 90% was recorded by infrared spectroscopic monitoring of the reactor effluent.

Table 1 below illustrates temperatures at which each reactant reached 90% conversion with respect to Example catalyst 1 and Comparative example catalysts A1-A3. As Table 1 illustrates, Example catalyst 1 prepared according to this disclosure and including a first metal oxide (alumina support), a second metal oxide overlayer (titanium oxide) with the catalytically active metal (palladium loading of 2 wt. %) achieved 90% conversion of each reactant gas at temperatures lower than those required for 90% conversion over an alumina catalyst lacking a titanium oxide overlayer (Comparative example A1) or over titania washcoats lacking an alumina support (Comparative examples A2, A3).

TABLE 1

Performance of Example catalyst 1 and Comparative example catalysts A1-A3

| | Example/Comparative Example | | | |
| | Example | Comparative Examples | | |
| | Catalyst | | | |
| Reactant | 1 | A1 | A2 | A3 |
| CO | 222 | 245 | * | 336 |
| NO | 223 | 281 | * | 356 |
| $C_3H_6$ | 228 | 258 | 493 | 367 |

TABLE 1-continued

Performance of Example catalyst 1 and
Comparative example catalysts A1-A3

| | Example/Comparative Example | | | |
|---|---|---|---|---|
| | Example | Comparative Examples | | |
| | Catalyst | | | |
| Reactant | 1 | A1 | A2 | A3 |
| $C_2H_4$ | 233 | 273 | 530 | 397 |
| $C_3H_8$ | 271 | 325 | * | 555 |

*Did not reach 90% conversion below 600° C.

TABLE 2

Performance of Example catalyst 2 and
Comparative example catalysts B1-B3

| | Example/Comparative Example | | | |
|---|---|---|---|---|
| | Example | Comparative Examples | | |
| | Catalyst | | | |
| Reactant | 2 | B1 | B2 | B3 |
| CO | 242 | 245 | 402 | 417 |
| NO | 270 | 281 | 379 | 351 |
| $C_3H_6$ | 251 | 258 | 332 | 325 |
| $C_2H_4$ | 266 | 273 | 368 | 351 |
| $C_3H_8$ | 319 | 325 | 444 | 439 |

Example 2

Catalyst (2) was prepared in the following manner: a commercial alumina was reacted with an ethanol solution of zirconium tetrakis(n-butoxide) (80% solution in n-butanol) (Zr:Al molar ratio 1:12), followed by evaporation of ethanol under heating and subsequent thermal decomposition of the zirconium precursor in an oven at 550° C. The resulting material was impregnated with an aqueous solution of tetraamminepalladium(II) nitrate sufficient to yield a final palladium loading of 2 wt. %, and again fired at 550° C.

Comparative example catalyst (B1) was prepared by impregnation of a commercial alumina with an aqueous solution of tetraamminepalladium(II) nitrate sufficient to yield a final palladium loading of 2 wt. %, and fired at 550° C.

Comparative example catalyst (B2) was prepared by combining zirconium tetrakis(n-butoxide) (80% in n-butanol) and water to precipitate a zirconium oxide support according to sol gel synthesis procedures known to those skilled in the art. The resulting precipitate was fired in an oven at 550° C. The fired oxide was then impregnated with an aqueous solution of tetraamminepalladium(II) nitrate sufficient to yield a final palladium loading of 2 wt. %, and fired at 550° C.

Comparative example catalyst (B3) was prepared by combining zirconium tetrakis(n-butoxide) (80% in n-butanol), tetraamminepalladium(II) nitrate, and water to co-precipitate a palladium-containing zirconium oxide support according to sol gel synthesis procedures known to those skilled in the art. The resulting precipitate was fired in an oven at 550° C. The loading of palladium was 2 wt. %.

Example catalyst 2 and Comparative example catalysts B1-B3 were placed in an oven and heated to 950° C. in the presence of 10% water vapor for 50 h (lean aging). After aging, the catalytic performance of each catalyst was evaluated using a flow-through micro reactor in the same way as was described above regarding Example 1.

Table 2 below illustrates temperatures at which each reactant reached 90% conversion with respect to the Example catalyst 2 and Comparative example catalysts B1-B3. As Table 2 illustrates, Example catalyst 2 prepared according to this disclosure and including a first metal oxide (alumina support), a second metal oxide overlayer (zirconium oxide) with the catalytically active metal (palladium loading of 2 wt. %) achieved 90% conversion of each reactant gas at temperatures lower than those required for 90% conversion over an alumina catalyst lacking a zirconium oxide overlayer (Comparative example B1) or over zirconia washcoats lacking an alumina support (Comparative examples B2, B3).

Example 3

Catalyst (3) was prepared in the following manner: a commercial alumina was reacted with an ethanol solution of titanium tetrakis(n-butoxide) (Ti:Al molar ratio 1:12), followed by evaporation of ethanol under heating and subsequent thermal decomposition of the titanium precursor in an oven at 600° C. The resulting material was impregnated with an aqueous solution of rhodium(III) nitrate sufficient to yield a final rhodium loading of 0.5 wt. %, and again fired at 600° C.

Comparative example catalyst (C1) was prepared by impregnation of a commercial alumina with an aqueous solution of rhodium(III) nitrate sufficient to yield a final rhodium loading of 0.5 wt. %, and fired at 600° C.

Figure 7:
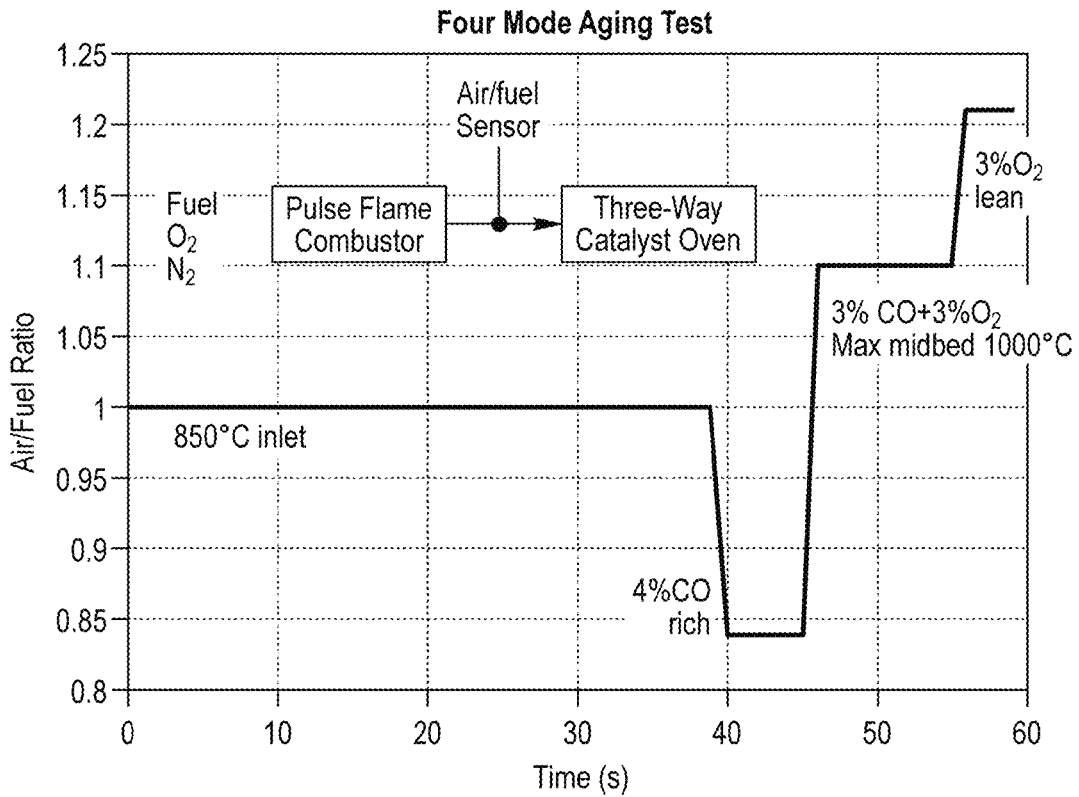
FIG. 7 schematically shows different modes of the Four Mode Aging test.

An accelerated aging treatment was then applied to the Example catalyst 3 and Comparative example catalyst C1 including 50-hour exposure to the combustion effluent of a pulse flame combustion reactor operating under closed loop air-fuel control, in which combustion of isooctane fuel in air was conducted in repeated cycles consisting of 40 seconds of stoichiometric operation operating under closed loop air-fuel control, 6 seconds of rich operation (3% excess CO), 10 seconds of exothermic operation (rich combustion with 3% excess CO in the pulse flame reactor combined with 3% excess O2 over the catalyst bed, net lean overall), and 4 seconds of lean operation (stoichiometric operation in the pulse flame reactor combined with 3% excess O2 over the catalyst bed). Temperature in the catalyst bed varied from 850° C. to 960° C. during each cycle. This aging schedule is accepted by the Environmental Protection Agency (EPA) for simulation of the effects of high mileage accumulation on automotive catalyst performance. The test is referenced as the "strawman durability procedure" by the EPA in 40 CFR Part 86 published Apr. 2, 2004, which is hereby incorporated by reference in its entirety. This test is further referenced herein as the "Four Mode Aging" test. FIG. 7 shows schematically the Four Mode Aging test modes and conditions. The Four Mode Aging test bench cycle includes a 60-second cycle which is defined as follows based on the A/F ratio of the engine (which is part of the aging bench) and the rate of secondary air injection (shop air which is added to the exhaust stream in front of the first catalyst): 01-40 secs: 14.7 A/F, no secondary air injection; 41-45 secs: 13.0 A/F ratio, no secondary air injection; 46-55 secs: 13.0 A/F ratio, 4% secondary air injection; and 56-60 secs: 14.7 A/F ratio, 4% secondary air injection.

After aging, the catalytic performance of Example catalyst 3 and Comparative example catalyst C1 was evaluated using a flow-through micro reactor in the same way as was described above regarding Example 1.

Table 3 below illustrates temperatures at which each reactant reached 90% conversion with respect to Example catalyst 3 and Comparative example catalyst C1. As Table 2 illustrates, Example catalyst 3 prepared according to this disclosure and including a titanium oxide overlayer (second metal oxide) over an alumina support (first metal oxide) with 0.5 wt. % loading of the catalytically active metal (rhodium), provides 90% conversion of each reactant gas at temperatures lower than those required for 90% conversion over Comparative example catalyst C1 lacking a titanium oxide overlayer.

TABLE 3

Performance of Example catalyst 3 and Comparative example catalyst C1

| | Example/Comparative Example | |
|---|---|---|
| Reactant | Example 3 | Comparative Example Catalyst C1 |
| CO | 191 | 256 |
| NO | 210 | 283 |
| $C_3H_6$ | 227 | 292 |
| $C_2H_4$ | 240 | 324 |
| $C_3H_8$ | 336 | 437 |

Examples 4-7

Two sets of Examples 4-7 were prepared by the same method as Example catalysts 1-3 above. Examples 4-7 included various loadings of rhodium deposited on the second oxide overlayer including different materials. Examples 4-7 were compared to a prior art TWC (Comparative example D) having 1.7 wt. % loading of palladium on particles including ceria-zirconia and alumina. Examples 4-7 and Comparative Example D were aged in the Four Mode Aging Test. After aging, the catalytic performance of each Example 4-7 and Comparative Example D was evaluated using a flow-through micro reactor as was described above in Example 1 at Lambda=0.998 (oxygen level of 0.69%, slightly rich conditions) (first set) and Lambda=1.00 (oxygen level of 0.74%) (stoichiometry) (second set), respectively.

TABLE 4

Performance of Example catalysts 4-7 (first set) and Comparative example catalyst D at Lambda = 0.998 after Four Mode Aging test

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 4 | 0.5 | $Al_2O_3$ | — | 254 | 284 | 291 | 326 | 439 |
| 5 | 0.6 | $Al_2O_3$ | 17 wt. % $ZrO_2$ | 201 | 202 | 213 | 242 | 370 |
| 6 | 0.5 | $Al_2O_3$ | 12 wt. % $TiO_2$ | 191 | 210 | 227 | 240 | 336 |
| 7 | 0.5 | $Al_2O_3$ | 17% $Nb_2O_5$ | 282 | 307 | 316 | 334 | 450 |
| Comparative Example D | 1.7 | — | — | 243 | 323 | 300 | 344 | 438 |

TABLE 5

Performance of Example catalysts 4-7 (second set) and Comparative example catalyst D at Lambda = 1.00 after Four Mode Aging test

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 4 | 0.5 | $Al_2O_3$ | — | 256 | 318 | 297 | 346 | 399 |
| 5 | 0.6 | $Al_2O_3$ | 17 wt. % $ZrO_2$ | 201 | 202 | 213 | 252 | 311 |
| 6 | 0.5 | $Al_2O_3$ | 12 wt. % $TiO_2$ | 190 | 222 | 233 | 253 | 293 |
| 7 | 0.5 | $Al_2O_3$ | 17% $Nb_2O_5$ | 282 | 339 | 328 | 360 | 429 |
| Comparative Example D | 1.7 | — | — | 244 | 327 | 298 | 332 | 402 |

Examples 8-15

Four sets of Examples 8-15 were prepared by the same method as Example catalysts 1-3. Examples 8-15 included various loadings of palladium on second oxide overlayers including different materials. Examples 8-15 were compared to a prior art TWC (Comparative Example D) having 1.7 wt. % loading of palladium on particles including ceria-zirconia and alumina. Examples 8-15 and Comparative Example D were aged in the Four Mode Aging test (first and second sets) or using the Lean Aging test (third and fourth sets). After aging, the catalytic performance of each Example catalyst 8-15 and Comparative example catalyst D was evaluated using a flow-through micro reactor as was described above in Example 1 at Lambda=0.998 (oxygen level of 0.69%) (first and third sets) and Lambda=1.00 (oxygen level of 0.74%)(second and fourth sets), respectively.

TABLE 6

Performance of Example catalysts 8-14 and Comparative example catalyst D at Lambda = 0.998 after Four Mode Aging test

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 8 | 2.0 | $Al_2O_3$ | — | 263 | 347 | 327 | 363 | 472 |
| 9 | 2.0 | $Al_2O_3$ | 12 wt. % $TiO_2$ | 252 | 319 | 305 | 335 | 434 |
| 10 | 2.0 | $Al_2O_3$ | 17 wt. % $ZrO_2$ | 264 | 340 | 321 | 357 | 453 |
| 11 | 2.0 | $Al_2O_3$ | 22 wt. % $CeO_2$ | 253 | 337 | 308 | 351 | 432 |
| 12 | 2.0 | $Al_2O_3$ | 13 wt. % $MnO_2$ | * | 353 | 326 | 345 | 421 |
| 13 | 2.0 | $Al_2O_3$ | 12 wt. % $Fe_2O_3$ | * | 435 | 362 | 401 | 536 |
| 14 | 2.0 | $Al_2O_3$ | 12 wt. % $Co_3O_4$ | * | 431 | 357 | 396 | 467 |
| Comparative Example D | 1.7 | — | — | 243 | 323 | 300 | 344 | 438 |

*Did not reach 90% conversion below 600° C.

TABLE 7

Performance of Example catalysts 8-14 and Comparative example catalyst D at Lambda = 1.00 after Four Mode Aging test

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 8 | 2.0 | $Al_2O_3$ | — | 268 | 355 | 327 | 360 | 431 |
| 9 | 2.0 | $Al_2O_3$ | 12 wt. % $TiO_2$ | 251 | 322 | 303 | 329 | 396 |

TABLE 7-continued

Performance of Example catalysts 8-14 and Comparative example catalyst D at Lambda = 1.00 after Four Mode Aging test

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 10 | 2.0 | $Al_2O_3$ | 17 wt. % $ZrO_2$ | 265 | 348 | 320 | 353 | 417 |
| 11 | 2.0 | $Al_2O_3$ | 22 wt. % $CeO_2$ | 254 | 342 | 308 | 349 | 417 |
| 12 | 2.0 | $Al_2O_3$ | 13 wt. % $MnO_2$ | 316 | 336 | 317 | 328 | 391 |
| 13 | 2.0 | $Al_2O_3$ | 12 wt. % $Fe_2O_3$ | * | 421 | 357 | 388 | 520 |
| 14 | 2.0 | $Al_2O_3$ | 12 wt. % $Co_3O_4$ | * | 411 | 359 | 380 | 452 |
| Comparative Example D | 1.7 | — | — | 244 | 327 | 298 | 332 | 402 |

*Did not reach 90% conversion below 600° C.

TABLE 8

Performance of Example catalysts 8-15 and Comparative example catalyst D at Lambda = 0.998 after Lean Aging test

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 8 | 2.0 | $Al_2O_3$ | — | 245 | 281 | 258 | 273 | 325 |
| 9 | 2.0 | $Al_2O_3$ | 12 wt. % $TiO_2$ | 222 | 223 | 228 | 235 | 276 |
| 10 | 2.0 | $Al_2O_3$ | 17 wt. % $ZrO_2$ | 242 | 270 | 251 | 266 | 319 |
| 11 | 2.0 | $Al_2O_3$ | 22 wt. % $CeO_2$ | * | 388 | 331 | 366 | 426 |
| 12 | 2.0 | $Al_2O_3$ | 13 wt. % $MnO_2$ | 270 | 304 | 277 | 303 | 374 |
| 13 | 2.0 | $Al_2O_3$ | 12 wt. % $Fe_2O_3$ | 258 | 286 | 283 | 307 | 424 |
| 14 | 2.0 | $Al_2O_3$ | 12 wt. % $Co_3O_4$ | 257 | 285 | 280 | 313 | 395 |
| 15 | 4.0 | $Al_2O_3$ | 12 wt. % $TiO_2$ | * | 351 | 312 | 341 | 404 |
| Comparative Example D | 1.7 | — | — | 255 | 333 | 313 | 355 | 453 |

*Did not reach 90% conversion below 600° C.

TABLE 9

Performance of Example catalysts 8-15 and Comparative example catalyst D at Lambda = 1.00 after Lean Aging test

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 8 | 2.0 | $Al_2O_3$ | — | 348 | 383 | 350 | 373 | 449 |
| 9 | 2.0 | $Al_2O_3$ | 12 wt. % $TiO_2$ | 258 | 258 | 263 | 271 | 320 |
| 10 | 2.0 | $Al_2O_3$ | 17 wt. % $ZrO_2$ | 277 | 291 | 282 | 291 | 345 |
| 11 | 2.0 | $Al_2O_3$ | 22 wt. % $CeO_2$ | 490 | 357 | 327 | 341 | 402 |
| 12 | 2.0 | $Al_2O_3$ | 13 wt. % $MnO_2$ | 252 | 284 | 265 | 275 | 350 |
| 13 | 2.0 | $Al_2O_3$ | 12 wt. % $Fe_2O_3$ | 252 | 286 | 278 | 290 | 408 |
| 14 | 2.0 | $Al_2O_3$ | 12 wt. % $Co_3O_4$ | 252 | 282 | 276 | 291 | 368 |
| 15 | 4.0 | $Al_2O_3$ | 12 wt. % $TiO_2$ | 304 | 318 | 295 | 309 | 375 |
| Comparative Example D | 1.7 | — | — | 251 | 343 | 309 | 352 | 419 |

Examples 16-19

Four set of Examples 16-19 were prepared by the same method as Example catalysts 1-3. Example 16-19 included 0.5 wt. % loading of rhodium on second oxide overlayers including different wt. % of $TiO_2$. Examples 16-19 were compared to a prior art TWC (Comparative Example D) having 1.7 wt. % loading of palladium on particles including ceria-zirconia and alumina. Examples 16-19 and Comparative Example D were tested fresh without aging using a flow-through micro reactor as was described above in Example 1 at Lambda=0.998 (oxygen levels of 0.69%) (first set) and at Lambda=1.00 (oxygen level of 0.74%) (second set), respectively.

The third and fourth set of Examples 16-19 were aged in the Four Mode Aging test. After aging, the catalytic performance of each Example catalyst 16-19 and Comparative example catalyst D was evaluated using a flow-through micro reactor as was described above in Example 1 at Lambda=0.998 (oxygen levels of 0.69%) (third set) and at Lambda=1.00 (oxygen level of 0.74%) (fourth set), respectively.

TABLE 10

Performance of Example catalysts 16-19 (first set) and Comparative example catalyst D at Lambda = 0.998 prior to aging

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 16 | 0.5 | $Al_2O_3$ | — | 188 | 246 | 252 | 274 | 389 |
| 17 | 0.5 | $Al_2O_3$ | 6 wt. % $TiO_2$ | 195 | 249 | 258 | 271 | 353 |
| 18 | 0.5 | $Al_2O_3$ | 12 wt. % $TiO_2$ | 179 | 227 | 236 | 253 | 342 |
| 19 | 0.5 | $Al_2O_3$ | 21 wt. % $TiO_2$ | 206 | 254 | 262 | 272 | 348 |
| Comparative Example D | 1.7 | — | — | 217 | 268 | 264 | 303 | 412 |

TABLE 11

Performance of Example catalysts 16-19 (second set) and Comparative example catalyst D at Lambda = 1.00 prior to aging

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 16 | 0.5 | $Al_2O_3$ | — | 199 | 259 | 261 | 281 | 348 |
| 17 | 0.5 | $Al_2O_3$ | 6 wt. % $TiO_2$ | 201 | 259 | 266 | 277 | 320 |
| 18 | 0.5 | $Al_2O_3$ | 12 wt. % $TiO_2$ | 179 | 233 | 238 | 258 | 298 |
| 19 | 0.5 | $Al_2O_3$ | 21 wt. % $TiO_2$ | 199 | 256 | 261 | 270 | 316 |
| Comparative Example D | 1.7 | — | — | 218 | 275 | 260 | 282 | 371 |

TABLE 12

Performance of Example catalysts 16-19 (third set) and Comparative example catalyst D at Lambda = 0.998 after Four Mode Aging test

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 16 | 0.5 | $Al_2O_3$ | — | 254 | 284 | 291 | 326 | 439 |
| 17 | 0.5 | $Al_2O_3$ | 6 wt. % $TiO_2$ | 238 | 280 | 283 | 300 | 382 |
| 18 | 0.5 | $Al_2O_3$ | 12 wt. % $TiO_2$ | 191 | 210 | 227 | 240 | 336 |
| 19 | 0.5 | $Al_2O_3$ | 21 wt. % $TiO_2$ | 238 | 273 | 276 | 288 | 376 |
| Comparative Example D | 1.7 | — | — | 243 | 323 | 300 | 344 | 438 |

TABLE 13

Performance of Example catalysts 16-19 (fourth set) and Comparative example catalyst D at Lambda = 1.00 after Four Mode Aging test

| Example/Comparative Example | Rh loading | First Metal Oxide | Second Metal Oxide | CO | NO | $C_3H_6$ | $C_2H_6$ | $C_3H_8$ |
|---|---|---|---|---|---|---|---|---|
| 16 | 0.5 | $Al_2O_3$ | — | 256 | 318 | 297 | 346 | 399 |
| 17 | 0.5 | $Al_2O_3$ | 6 wt. % $TiO_2$ | 242 | 302 | 292 | 322 | 353 |
| 18 | 0.5 | $Al_2O_3$ | 12 wt. % $TiO_2$ | 190 | 222 | 233 | 253 | 293 |
| 19 | 0.5 | $Al_2O_3$ | 21 wt. % $TiO_2$ | 232 | 288 | 281 | 300 | 341 |
| Comparative Example D | 1.7 | — | — | 244 | 327 | 298 | 332 | 402 |

Figure 8:
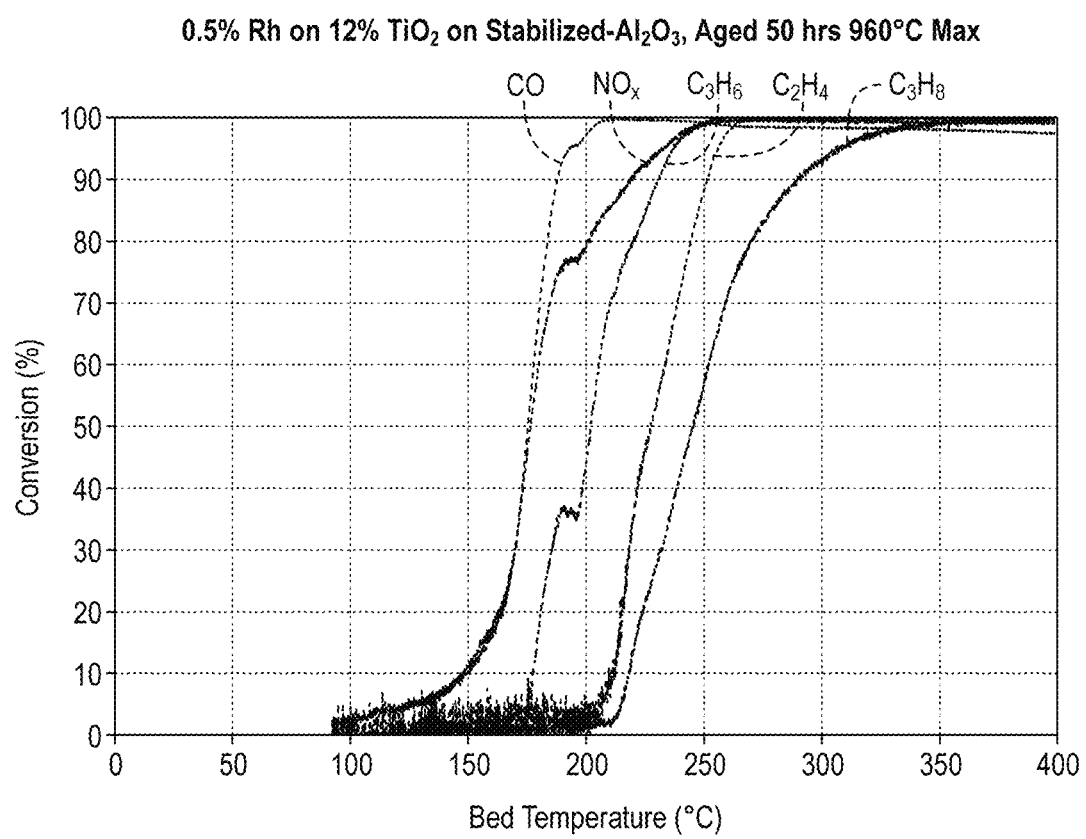
FIG. 8 depicts a plot of conversion temperature versus percentage of HCs, CO, and NOx conversion by a catalyst having 0.5 wt. % rhodium loading on 8 wt. % Ti (12 wt. % $TiO_2$) overlaying stabilized $Al_2O_3$ support oxide after the Four Mode Aging test, measured at stoichiometry.
Figure 9:
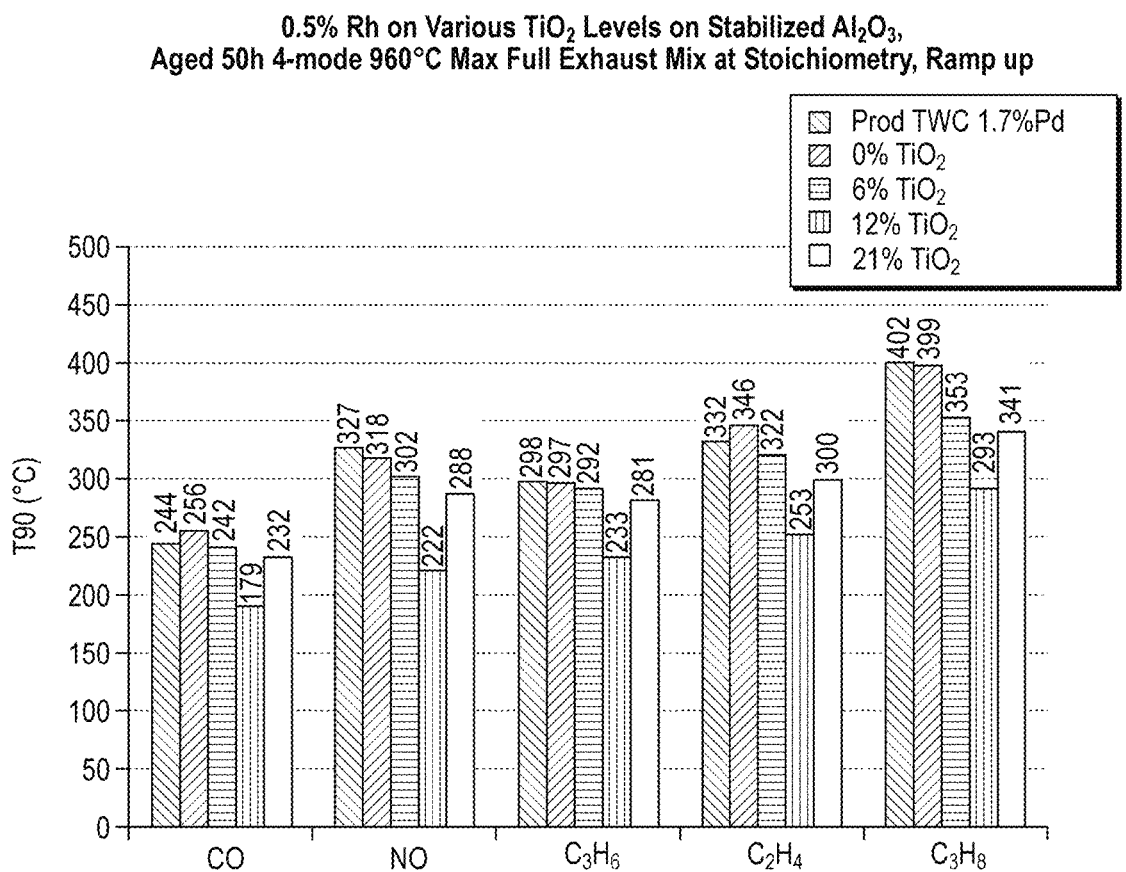
FIG. 9 shows a plot of conversion temperature versus HCs, CO, and NO 90% conversion by a catalyst having 0.5 wt. % rhodium loading on various loadings of $TiO_2$ overlaying stabilized $Al_2O_3$ support oxide after the Four Mode Aging test, measured at stoichiometry.

FIG. 8 shows results for Example 18 at Lambda=1.00 (0.74% O2) after Four Mode Aging test. FIG. 9 shows the results included in Table 12.

Examples 20-25

Examples 20-25 were prepared by the same method as Example catalysts 1-3. Examples 20-25 included various loadings of rhodium on second oxide overlayers including 17 wt. % of $ZrO_2$ or 12 wt % of $TiO_2$, respectively. Examples 20-25 were aged in the Four Mode Aging test. After aging, the catalytic performance of each catalyst 20-25 was evaluated using a flow-through micro reactor as was described above in Example 1 at oxygen level of 0.74% (stoichiometry).

TABLE 14

Performance of Example catalysts 20-25 at Lambda = 0.998 after Four Mode Aging test

| Example | Rh loading | First Metal Oxide | Second Metal Oxide | CO | NO | $C_3H_6$ | $C_2H_6$ | $C_3H_8$ |
|---|---|---|---|---|---|---|---|---|
| 20 | 0.2 | $Al_2O_3$ | 17 wt. % $ZrO_2$ | 221 | 295 | 266 | 303 | 365 |
| 21 | 0.6 | $Al_2O_3$ | 17 wt. % $ZrO_2$ | 201 | 202 | 213 | 252 | 311 |
| 22 | 1.0 | $Al_2O_3$ | 17 wt. % $ZrO_2$ | 273 | 299 | 309 | 336 | 446 |
| 23 | 0.1 | $Al_2O_3$ | 12 wt. % $TiO_2$ | 289 | 361 | 332 | 380 | 474 |
| 24 | 0.5 | $Al_2O_3$ | 12 wt. % $TiO_2$ | 190 | 222 | 233 | 253 | 293 |
| 25 | 1.0 | $Al_2O_3$ | 12 wt. % $TiO_2$ | 246 | 294 | 296 | 322 | 392 |

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method comprising:
utilizing a three-way catalytic converter, having a catalyst formed from a plurality of particles each including a first metal oxide center, a second metal oxide monolayer, and a catalytically active metal to decrease concentration of hydrocarbons, carbon monoxide, and nitrogen oxides in exhaust gas during stoichiometric, rich, and lean conditions, wherein a molar ratio of metal in the monolayers to metal in the centers is between about 0.01 and 0.2 and wherein a loading of the catalytically active metal is about 0.5 to 5 wt. % of palladium or about 0.1 to 1 wt. % of rhodium, based on the total weight of the catalyst.

2. The method of claim 1, wherein interfaces between the centers and monolayers, the monolayers, or both include catalytically active metal.

3. The method of claim 1, wherein some of the monolayers are continuous.

4. The method of claim 1, wherein the centers comprise transitional alumina, baria, lanthana, silica, titania, zirconia, or a combination thereof.

5. The method of claim 1, wherein the monolayers comprise ceria, cobalt oxide, iron oxide, hafnia, manganese oxide, niobia, tantala, titania, zirconia, or a combination thereof.

6. The method of claim 1, wherein the centers are stabilized with about 1 to 15 wt. % of barium, lanthanum, silicon, or a combination thereof, based on a total weight of the catalyst.

7. The method of claim 1, wherein the catalyst is coated onto a ceramic or metallic monolith substrate that defines flow through channels or a wall flow configuration.

8. The method of claim 1, further including trapping and oxidizing soot during cold start.

9. The method of claim 1, further comprising converting at least 90% of CO at a temperature between about 150° C. and 250° C., NO at a temperature between about 200° C. and 270° C., $C_2H_4$ at a temperature between about 200° C. and 270° C., $C_3H_6$ at a temperature between about 200° C. and 270° C., $C_3H_8$ at a temperature between about 230° C. and 350° C., or a combination thereof.

10. A method of forming a catalytic converter catalyst comprising:
arranging first and second metal oxides to form particles each with a center of the first metal oxide and a monolayer of the second metal oxide on the center by contacting the centers with a soluble complex of one or more elements of the second metal oxide at a molar ratio of metal in the second metal oxide to metal in the first metal oxide of about 0.01 to 0.2, and depositing catalytically active metal onto each of the monolayers at interfaces between the first and second metal oxides, or both, to produce a catalytic converter catalyst comprising about 0.5 to 5 wt. % of palladium or about 0.1 to 1 wt. % of rhodium, based on the total weight of the catalyst.

11. The method of claim 10, wherein the soluble complex comprises one or more alkoxide groups.

12. The method of claim 10, wherein the soluble complex comprises a metal alkoxide having a formula $M_x(OR)_v$ (I), wherein M is Ti, Zr, Hf, Ni, or Ta, R is a linear or branched alkyl group having a formula $C_nH_{2n+1}$, wherein n is 1 to 6, x is 1 or 2, and v is 4, 5, 8, or 10, or a formula $MO(OR)_3$ (II), wherein M is Ni or Ta, and R is a linear or branched alkyl group having a formula $C_nH_{2n+1}$, wherein n is 1 to 6.

13. The method of claim 10, further comprising applying the catalyst onto a ceramic or metal monolithic substrate.

14. An automotive catalytic converter catalyst comprising:

a first metal oxide forming each of a plurality of automotive catalytic converter catalyst particle centers;

a second metal oxide applied as a monolayer to each of the centers; and a catalytically active metal deposited onto each of the centers, the monolayers, or both, wherein a molar ratio of metal in the second metal oxide to metal in the first metal oxide is between about 0.01 and 0.2, and wherein a loading of the catalytically active metal is about 0.5 to 5 wt. % of palladium or about 0.1 to 1 wt. % of rhodium, based on the total weight of the catalyst.

15. The catalyst of claim 14, wherein some of the monolayers are discontinuous.

16. The catalyst of claim 14, wherein the first metal oxide comprises transitional alumina, baria, lanthana, silica, titania, zirconia, or a combination thereof.

17. The catalyst of claim 14, wherein the second metal oxide comprises ceria, cobalt oxide, iron oxide, hafnia, manganese oxide, niobia, tantala, titania, zirconia, or a combination thereof.

18. The catalyst of claim 14, wherein the first metal oxide is stabilized with about 1 to 15 wt. % of barium, lanthanum, silicon, or both based on a total weight of the catalyst.

19. The catalyst of claim 14, wherein the first metal oxide is transitional alumina, the second metal oxide is about 10-14 wt. % $TiO_2$.

20. A method comprising:

decreasing exhaust gas concentration of hydrocarbons, carbon monoxide, and nitrogen oxides by utilizing a three-way catalytic converter having a catalyst comprising particles, each including a first metal oxide center, a second metal oxide monolayer, and rhodium with loading of 0.3 to 0.7 wt. %, based on the total weight of the catalyst, wherein a molar ratio of metal in the monolayers to metal in the centers is between about 0.01 and 0.2.

* * * * *

UNITED STATES PATENT AND TRADEMARK OFFICE
CERTIFICATE OF CORRECTION

| | | |
|---|---|---|
| PATENT NO. | : 9,914,095 B1 | Page 1 of 1 |
| APPLICATION NO. | : 15/427618 | |
| DATED | : March 13, 2018 | |
| INVENTOR(S) | : Andrew Gregory Getsoian et al. | |

It is certified that error appears in the above-identified patent and that said Letters Patent is hereby corrected as shown below:

Column 1, Line 8:
Before the heading BACKGROUND
Insert:
--STATEMENT REGARDING FEDERALLY SPONSORED RESEARCH OR DEVELOPMENT
The invention was made with Government support under Contract No. DE-EE0006845 awarded by the Department of Energy. The Government has certain rights to the invention.--

Signed and Sealed this
First Day of May, 2018

Andrei Iancu
*Director of the United States Patent and Trademark Office*